Nov. 21, 1961     W. W. DEIGHTON     3,009,635
ELECTRO-MECHANICAL TRANSDUCER

Filed Sept. 20, 1957     7 Sheets-Sheet 1

INVENTOR.
WILLIAM W. DEIGHTON
BY
Carl Fissell Jr.
AGENT

Nov. 21, 1961   W. W. DEIGHTON   3,009,635
ELECTRO-MECHANICAL TRANSDUCER
Filed Sept. 20, 1957   7 Sheets-Sheet 2

INVENTOR.
WILLIAM W. DEIGHTON
BY
AGENT

INVENTOR.
WILLIAM W. DEIGHTON

BY

AGENT

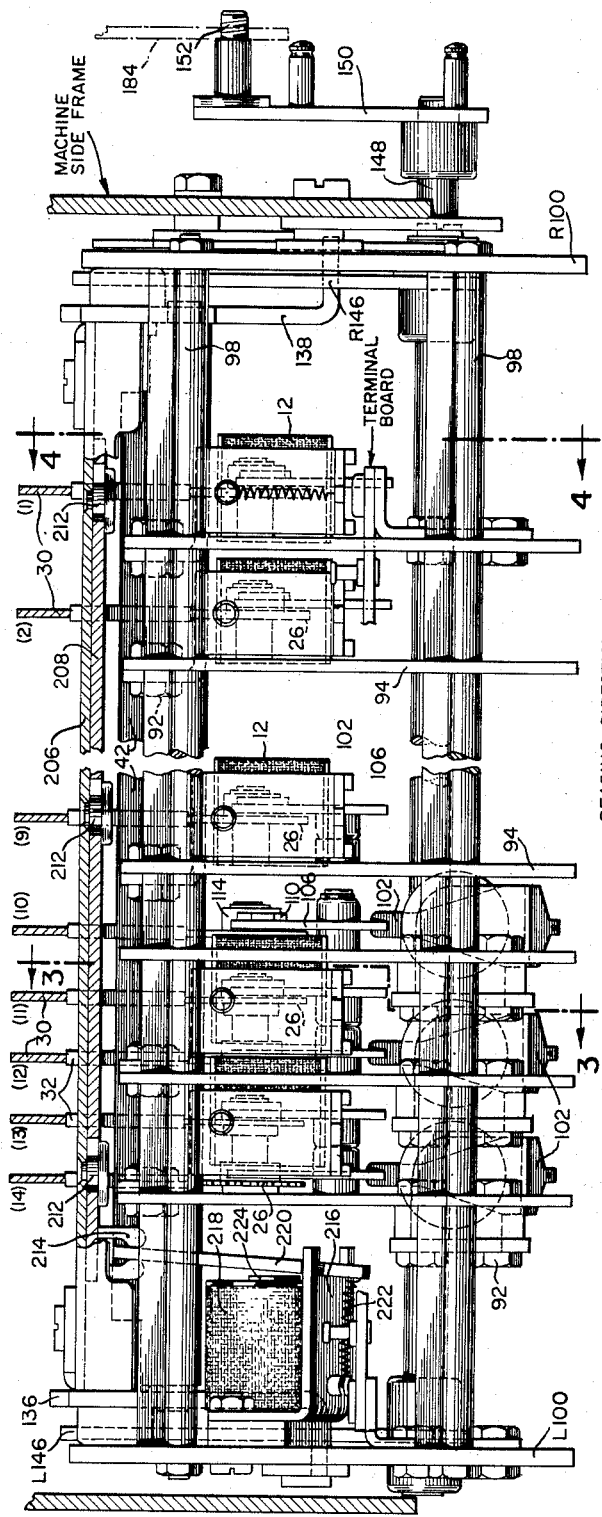

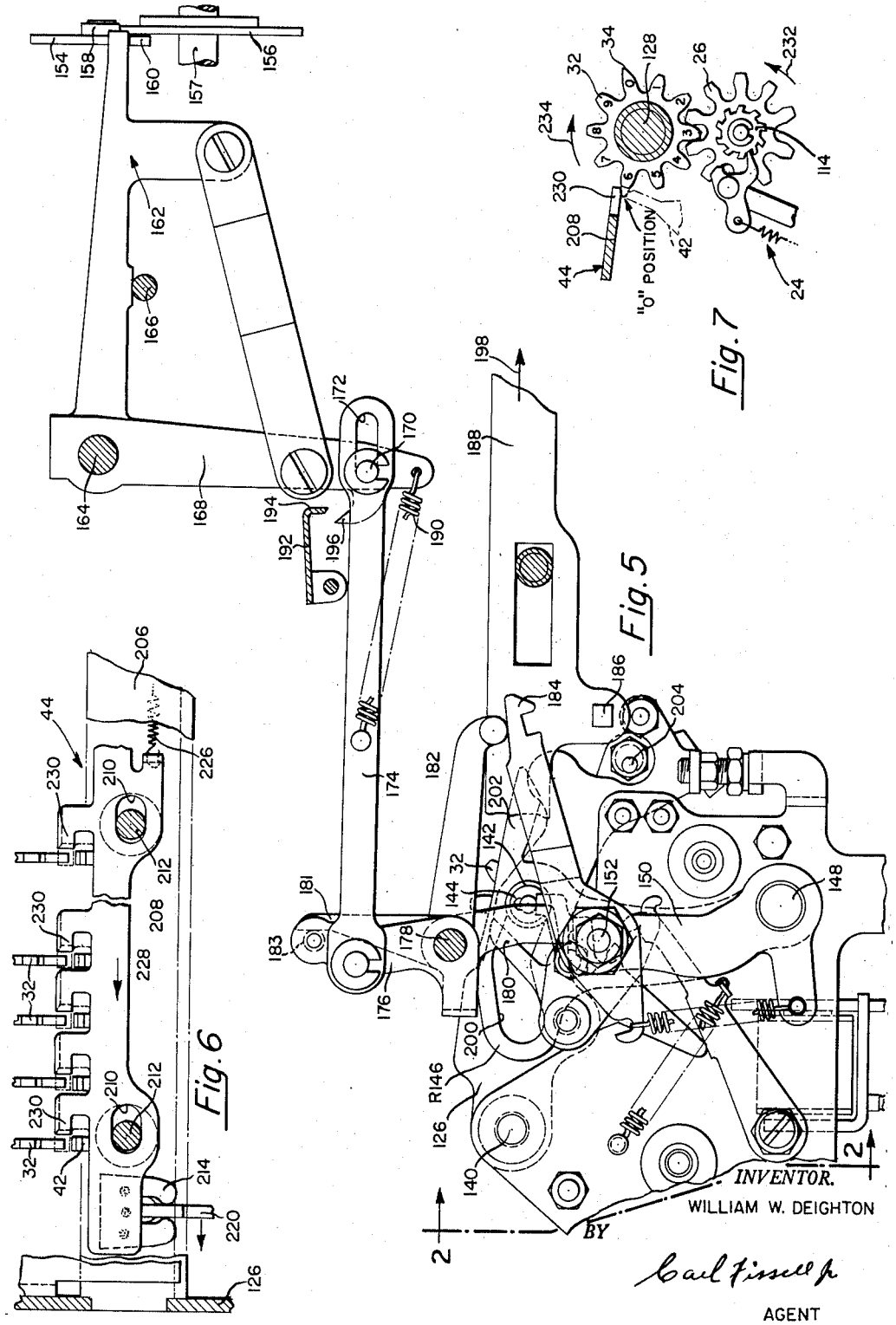

# United States Patent Office 3,009,635
Patented Nov. 21, 1961

3,009,635
ELECTRO-MECHANICAL TRANSDUCER
William W. Deighton, Glen Mills, Pa., assignor to Burroughs Corporation, Detroit, Mich., a corporation of Michigan
Filed Sept. 20, 1957, Ser. No. 685,240
26 Claims. (Cl. 235—61.6)

This invention relates to a transducer system and apparatus for translating electro-magnetic information into mechanical motion, and more specifically has to do with electro-mechanical apparatus whereby a plurality of electromagnets control the mechanical positioning of a plurality of differentially positionable members in an accounting machine.

In accounting machines of the type shown and described in the patent to T. M. Butler, 2,729,392, it is the usual practice to employ a number of differentially positionable members, e.g., elongated toothed racks which are disposed in parallel planes in side by side relation in the machine. These racks generally extend from front to back in the machine and are controlled from a keyboard by means of differential mechanisms associated therewith. These latter mechanisms are adapted to limit the forward or rearward excursions of the racks, after which, in a manner and by means of other apparatus described and claimed in the aforementioned Butler patent, print bars are caused to print out the information in the racks.

Also employed in machines of the foregoing type are a number of so-called registers or crossfooters of the type shown and described in Butler Patents 2,721,695 and 2,715,999. These mechanisms are used to accumulate, total, sub-total and otherwise affect the summarization of the information handled by the machine. Each crossfooter or register, as the case may be, occupies a particular section in the machine, i.e., sections A, B, C or D starting with section "A" at the front of the machine described in Runde Patent 2,765,980. Each crossfooter or register, hereinafter referred to as a crossfooter, of the machine, is adapted to engage the actuator racks thereof in such a manner that during each cycle of operation of the accounting machine physical movement of certain parts of the crossfooter assembly is caused to take place whereby addition and/or subtraction is performed by the machine. Movement of these parts of the crossfooter is produced by means of cams and links which are actuated from the main drive shaft of the machine in a manner described in detail in the aforementioned patents.

The present invention enables an accounting machine to sense or pick up and utilize information other than by means of the keyboard of the machine. For example, means is provided enabling the machine to utilize data sensed from a magnetic record disposed on an accounting document or record member as the record member is traversed into and out of the carriage of the machine. The record member and traversing mechanism may be of the type described and claimed in a co-pending patent application to Deighton et al., S.N. 598,454, filed July 17, 1956, entitled "Automatic Accounting Machine," and assigned to the assignee of the present invention. Means is also provided for controlling one accounting machine from a remotely located control point, or from another similar accounting machine.

Attempts have been made in the past to condition certain of the accounting machine functions or to pick up and transfer information from one machine to another by control means external thereto. These devices have in some instances been operated from the main drive of the accounting machine by means of standard cams and links on the machine. However, relatively low operating speeds, complexity of the mechanisms and extremely high machine tolerances have limited their application and use rather stingently.

Therefore, it is an important object of the present invention to provide a novel transducer system and apparatus for translating electrical information into mechanical motion.

It is another object of the present invention to provide a novel transducer system and apparatus for translating electromagnetic pulse information into mechanical motion.

It is another important object of the present invention to provide a transducer system capable of utilization in a plurality of machines whereby simultaneous remote control of one or a number of other similar machines is made possible.

It is still another object of the present invention to reduce the time required to read information data into the racks of an accounting machine from magnetically coded record media handled by the same or another similar machine.

A further object of the present invention is to provide a simple and inexpensive read-in mechanism for a pulse or impulse actuated pick-up apparatus.

A still further object of the present invention is to provide improved apparatus for automatically causing an electrical signal to control a rack positioning mechanism.

It is also an object of the present invention to provide improved apparatus for automatically controlling the rack movement of one accountiny machine by means of the electrical pulse output of another and different machine.

Another object of the invention is to provide a transducer read-in system which can be employed in an accounting machine without modification of the racks of the machine.

It is an additional object of the invention to provide a less complex and more reliable read-in unit than was heretofore available.

In accordance with the foregoing objects a preferred embodiment of the present invention provides a transducer system including a high speed step by step read-in mechanism including a plurality of electromagnets which are disposed as a unitary assembly in one of the standard register positions beneath the actuator racks of an accounting machine. Each electromagnet is provided with an escapement actuated by the clapper of the electromagnet. The escapement operatively engages the teeth of a ratchet wheel so as to rotate the ratchet wheel one tooth or step each time its electromagnet is pulsed. A pinion wheel having teeth similarly fashioned to those of the pinion wheels described in "Transfer Mechanism for Calculating Machines" illustrated and claimed in Butler Patent 2,715,999 is provided for and engages each ratchet wheel. As each ratchet wheel is rotated, its respective pinion is also rotated and thereby displaced arcuately a number of teeth or steps equal to the number of pulses applied to the electromagnet.

Means operatively associated with all of the pinions is adapted to engage the pinions with their respective racks. As the racks are reciprocated in their normal cycle of machine operation one of the teeth of each pinion is caused to limit against a stop member. In this manner the positional information in each pinion wheel, i.e., the digital data stored therein, is thus transferred to its respective rack. Additionally means is provided in the present mechanism to prevent accidental release of the information stored in the pinions by causing the pinions to be momentarily immobilized during the course of their movement toward the racks. Means is also provided for correcting wrong information by extracting it from the pinion wheels by rerotation thereof, i.e., zeroizing the pinions before they are permitted to engage the racks.

Referring now more particularly to the drawings wherein:

FIG. 2 is a front elevational view of the novel read-in mechanism forming an important part of the present invention;

FIG. 5 is a right side elevational view of the control lane tappet linkage for the present invention;

FIG. 6 is a top plan of a fragmentary portion of the error correcting mechanism of the present invention;

FIG. 7 is a detail view of a portion of the mechanism of FIG. 3; and

FIGS. 8A and 8B are sectional views of fragmentary portions of the mechanisms of FIG. 4 illustrating the read-in operation of the present invention.

A most important field of use to which the present invention is directed is that of providing a transducer system and apparatus for automatically sensing and interpreting or translating the pulse output from a magnetizable tape used on coded documents of the type disclosed in the above-identified Deighton et al. application.

The coding used herein is a serial-binary type in which electrical pulses or bits in various combinations of the 1—2—4—4 binary code are employed to express the decimal digits 0–9. The pulses are scanned or read one after another in serial fashion. For example: the decimal number 7 consists of the binary bits 1, 2 and 4; the decimal number 9 is represented by the binary bits 1, 4 and 4; and zero is the absence of any binary bits.

One type of accounting machine with which the present embodiment may be employed utilizes so-called decimal actuator racks, i.e., the position of an individual rack corresponds to one of the decimal digits 0–9. In order to position the racks by means of the serial binary information aforementioned, a decoding device is employed as will be described hereinafter.

Exclusive of Sterling monetary applications such as are employed in Great Britain and her colonies, a maximum of 9 steps is required for a decimal transducer read-in for machines of the foregoing type. For machines employing the pound sterling monetary system of numbering a total of 11 steps must be provided. The present embodiment contemplates the utilization of 9 steps while providing means for eleven, thus making the machine adaptable for use in countries other than the United States of America.

Figure 1:
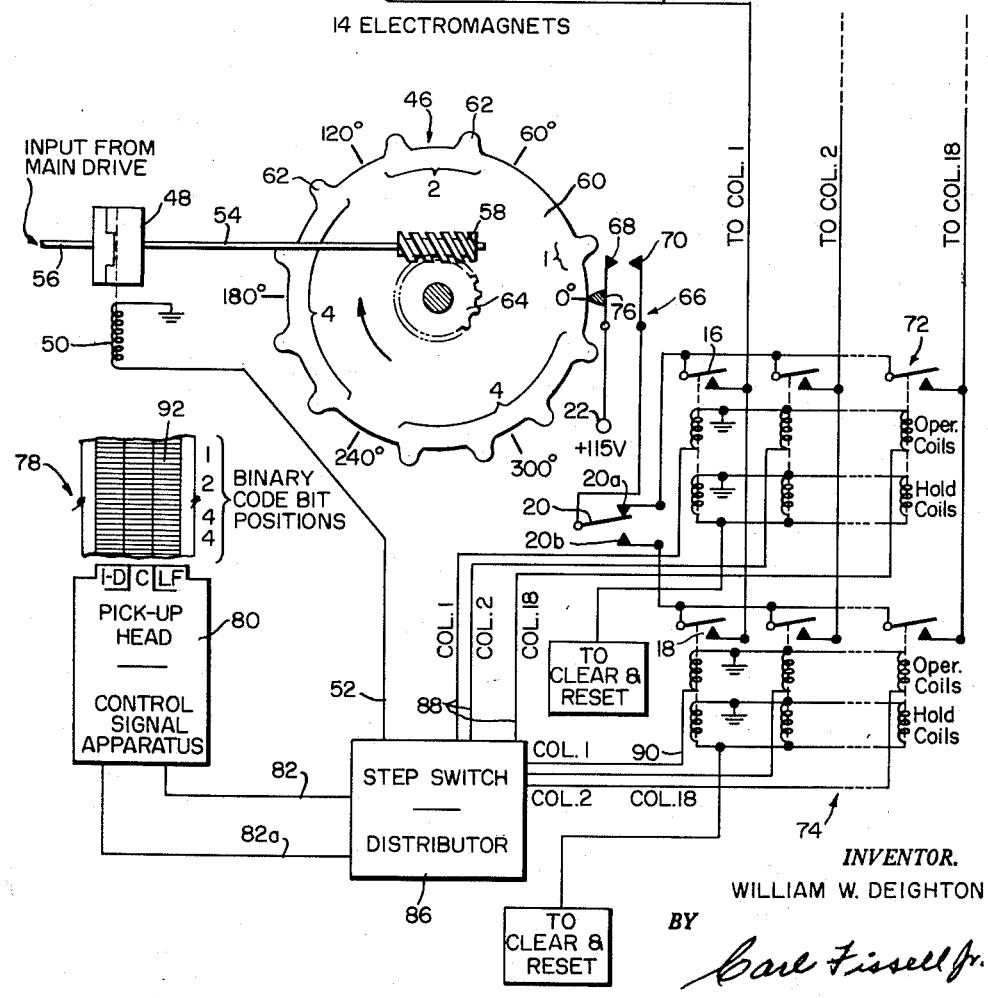
FIG. 1 is a general schematic view of a read-in system embodying the present invention.

Referring in the first instance to FIGS. 1, 8A and 8B of the drawings, wherein there is shown a schematic illustration of an electro-mechanical transducer system embodying the present invention, it is seen that a step by step type read-in mechanism 10 employing an electromagnet 12 is adapted to be pulsed over the conductor or line 14 from one or the other of two relay points 16 or 18 through switching relay 20 from a 115 volt source of electrical potential 22.

An escapement 24 driven by electromagnet 12, in a manner to be described in more detail later on, is adapted to rotate a ten toothed escapement wheel 26 in a counterclockwise direction as shown by arrow 28. The direction of rotation being a matter of choice dictated by the direction of movement of differential positionable members hereinafter referred to as racks 30.

Pinion 32, provided with ten peripheral teeth, including a so called long tooth 34, and movable into and out of engagement with one of the racks 30 by means of cam device 36, engages escapement wheel 26 and is rotated step by step thereby to positions indicative of information received from the electromagnet 12.

By means of mechanism 38, rack 30 is adapted to be reciprocated across pinion 32 while engaged therewith so that the information standing in the pinion is transferred to the rack as will be explained presently. The forward and rearward excursions of each of the racks, as indicated by arrow 40, are selectively terminated, in a manner to be explained later on, by limit means 42. Member 44, which is moved into and out of the path of pinion 32, is adapted to zeroize pinion 32 thus to prevent erroneous information from being transferred into the racks during operation of the transducer mechanism. The construction and operation of member 44 will also be described more fully later on.

Operatively associated with the foregoing mechanism is pulse generating means 46, which is part of the decoding device mentioned earlier herein. A half revolution clutch 48 controlled by a solenoid 50 over line 52 from a distributor mechanism hereinafter identified and described causes shaft 54, when driven from the main drive 56 on an accounting machine, or other external power source, to rotate a 3 to 1 worm drive 58. The half revolution clutch used with the present invention is of the old and well known mechanical type and includes means for mechanically detenting the clutch shaft at the end of each 180° of rotation thereof. The clutch is or may be controlled by the solenoid 50 to the extent that each time the solenoid is energized or pulsed, the clutch will permit the shaft with which it is associated to rotate a half revolution and then stop. If the solenoid 50 is maintained energized it is apparent that the clutch shaft will rotate continuously. By virtue of the three-to-one reduction gearing employed with the pulse generator shaft of the present invention, each one-half revolution of the clutch shaft will drive the pulse generator cam associated therewith through one-sixth of a revolution except as hereinafter noted.

A dielectric cam member 60 rotatable in a clockwise direction having peripheral protuberances 62 corresponding in number and spacing to the desired 1—2—4—4 binary code, as shown by means of the brackets in FIG. 1, is mounted on gear 64 engaging worm drive 58. Switch 66, including two contact points 68 and 70 is alternately connected in a circuit with one of two groups or banks of relays 72 and 74 through earlier mentioned switch 20. The switch 20 is electrically in circuit with the aforedescribed read-in stepper magnet 12 over the line 14. A cam follower 76 secured to leg 68 of switch 66 is adapted to open and close contact points 68 and 70 as cam 60 is rotated. Cam 60 is thus capable, when rotated by the drive mechanism, of producing a binary coded electrical pulse output corresponding in number to the digits 0–11, only the digits 0–9 being used in the present embodiment, as before mentioned. Thus during the first 60° of clockwise rotation thereof from 0° to 60°, the one-bit lobe is operative. During the second 60° of rotation, (from 60° to 120°) the two-bit lobes are operative. Rotation of the cam from 120° to 240° as hereinafter set forth permits the first set of four-bit lobes to be operative. Finally, from 240° to 360° the second set of four-bit lobes is operative.

Digital data or information, i.e., the numbers 0–9, is picked up electrically from document 78 by means of a scanning or pick up head assembly 80 and forwarded over line 82 to a distributor mechanism 86. The latter mechanism may take a variety of forms. One such distributor includes a plurality of stepping switches such as the switch described and claimed in co-pending U.S. patent application to W. W. Deighton, S.N. 492,247, now Patent No. 2,906,838, filed March 4, 1955 entitled "Program Scanning Apparatus" and assigned to the same assignee as the present invention.

The information pick up rate at the heads 80 is on the order of 200 pulses per second. This high speed is or may be slightly in excess of the operating capacity of the stepping switches. In order to utilize the above-mentioned switch mechanism, a pulse time-sharing system is employed herewith.

A conventional and well known flip flop device 84, one example of which is set forth in Patent 2,719,228 to Auerbach et al. is used conjointly with the distributor 86, together with other electrical circuitry (not shown) to selectively gate alternate, serially applied pulses into the stepping switches of the distributor. The flip flop permits the pulses which are picked up by the heads 80 and applied thereto at a rate of 200 pulses per second to be forwarded to the stepping switches in two groups of 100 pulses per second which slower pulse rate can be more effectively handled by the aforementioned switches.

Figures 1A, 1B:
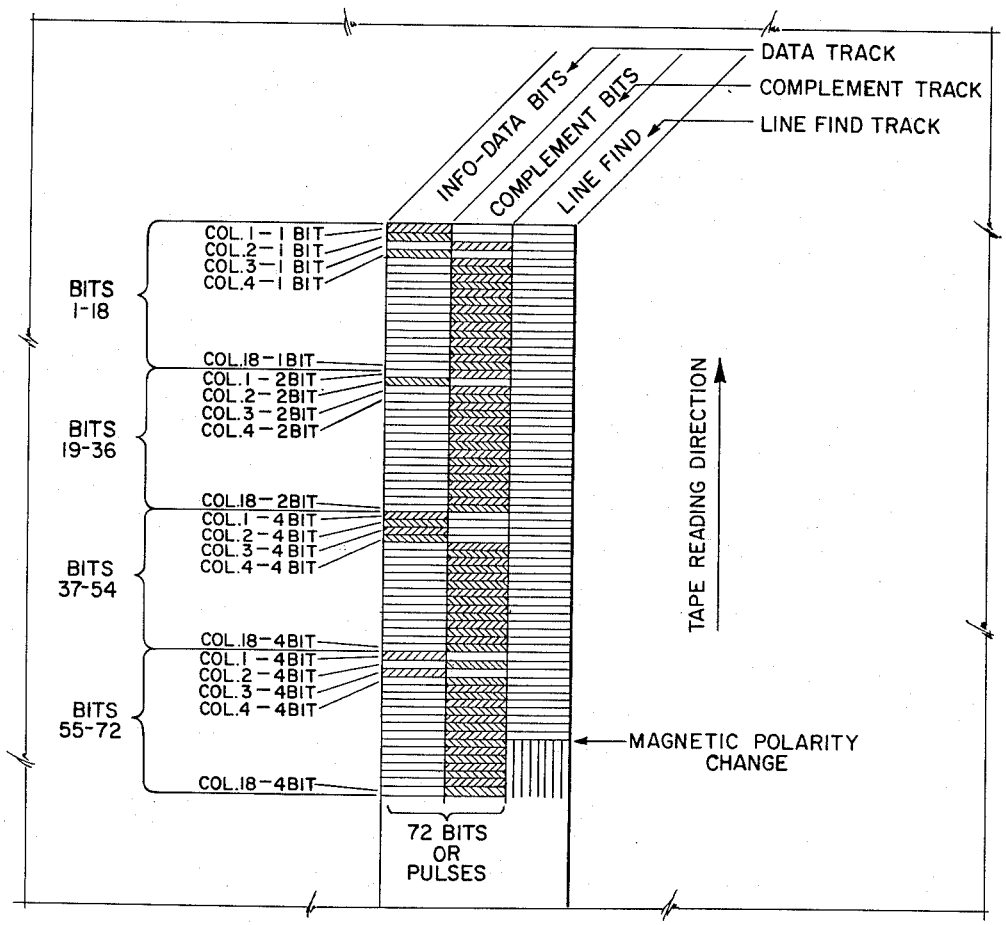
FIG. 1A is a view illustrating the number coding utilized with the invention.
FIG. 1B is a diagrammatic view of the binary code representation of the present invention.

Referring now to FIGS. 1a and 1b it can be seen that the document 78 is provided with a magnetizable band or strip 92 suitably applied thereto. The magnetizable strip is divided lengthwise into three substantially parallel portions or tracks labelled respectively, Information-Data, Complement and Line-Find, as shown, and is adapted to be scanned or read from and written upon by means of the magnetic head assembly 80 (FIG. 1) comprising three heads, namely, a data, complement and a line find head.

Initially, during a writing cycle in the operation of the accounting machine (not shown) 72 pulses or bits of information or data are placed upon the data and complement portions of the tape in serial fashion as the record document 78 bearing the tape is swept under the head assembly 80. The 72 bits, which is the total number of bits derived by adding together the bits in both the data and the complement tracks, are divided, for convenience of handling, into four groups of 18 bits each. Each bit in each of the data and complement columns or tracks is related to a separate relay in the two banks of relays 72 and 74. During a reading cycle only those bits which energize the information data reading head of the sensing device 80 are directed to and close relays in the banks 72—74 corresponding in position thereto, while all of the bits "data and complement" together are used to step the stepping switch distributor 86. The first eighteen or "one" bits are applied to the relays of relay bank 72 first. The second eighteen or "two" bits are applied to the relays of relay bank 74 second. The third eighteen or "four" bits are next applied to the relays in relay bank 72 and the final eighteen or "four" bits are applied to the relays in relay bank 74. More particularly, in serial fashion the first bit of the first group of eighteen bits is directed to the first relay in bank 72, the second bit is directed to the second relay in this bank, and so on through each of the eighteen relays in the bank. Whenever the sensing device 80 detects a magnetized bit in the data column of the ledger card the relay in either bank corresponding to that bit position is closed.

Figure 1C:
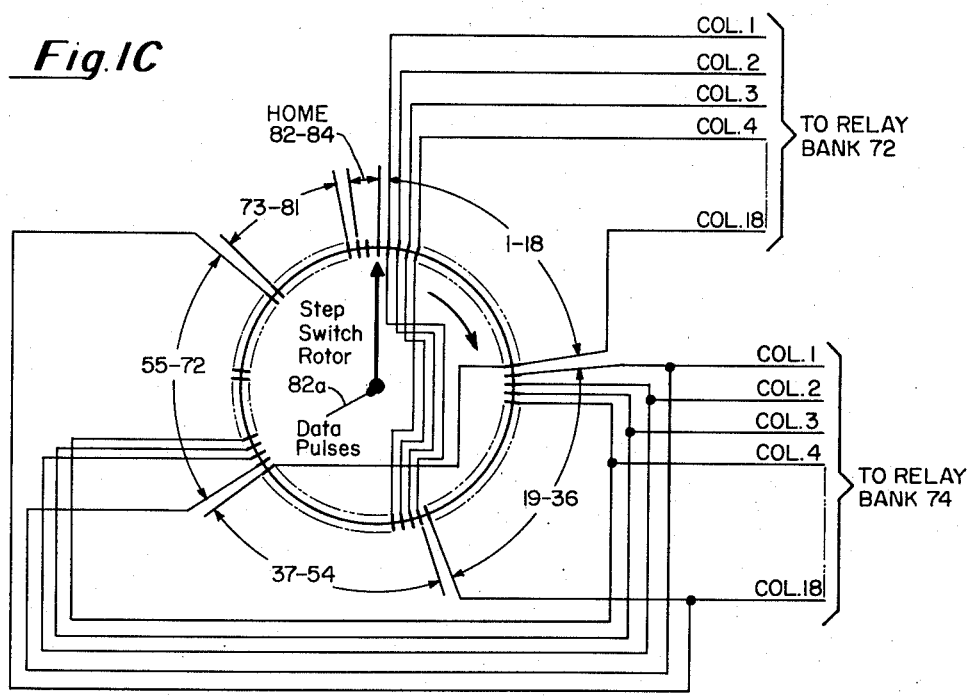
FIG. 1C is a schematic representation of the stepping switch used with the present invention.
Figure 1D:
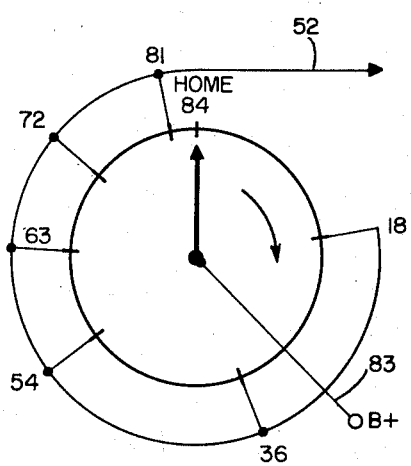
FIG. 1D is a diagrammatic view illustrating the second tier for the stepping switch of FIG. 1C.

The stepping switch of the distributor mechanism 86 is or may be provided with a second contact carrying tier and a rotor as seen most clearly in FIG. 1D, which is operable conjointly with the first rotor and includes a wiper arm which is movable across a plurality of stator contacts disposed on this tier and designated 18, 36, 54, 63, 72, 81 and 83 or home, respectively. A source of positive potential identified as B+ is directed to the second rotor via the lead 83 and thus provides an electrical pulse output means for these positions. Assuming that a read-in operation is called for and that the ledger sheet is passed by means (not shown) beneath the pick-up heads, the relays of banks 72 and 74 will be actuated as hereinbefore set forth. Certain relays in each bank will be closed depending on which relays have had information pulses applied thereto. At the eighteenth pulse or bit position of the second tier of the stepping switch, a pulse FIG. 1F is directed by means of the second rotor to the solenoid 50, FIG. 1, of the pulse generator clutch apparatus. This pulse energizes solenoid 50 thereby causing the clutch shaft to rotate a half revolution. By means of the reduction gearing aforementioned the pulse generator cam 60 is caused to take its first one-sixth of a revolution from 0° to 60° as earlier described. Switch 20 has previously closed contacts 20a permitting the one bit pulse from pulse generator cam 60 to pass through the closed relay contacts of the relays of bank 72 from which closed members these pulses flow along parallel leads as seen in FIG. 1, to the individual stepping coils 12 to thereby step wheels 26 one step. At the end of the first sixth of a revolution relay bank 72 is cleared FIG. 1F in a manner old and well-known in the art as by de-energizing the hold coils thereof to cause the banks of relays thus to be reset.

At the thirty-sixth bit position of the stepping switch, (the end of the second eighteen bits on the ledger card), a pulse is directed from the second tier rotor to the thirty-sixth column stator contact of the stepping switch and thence to the clutch solenoid 50 energizing the solenoid and causing the pulse generator to take its second sixth of a revolution from 60° to 120° in the manner previously described. This latter operation sends a "two-bit" pulse through the closed relays of bank 74 by way of switch 20 and contacts 20b, which have now been switched from their 20a position to the 20b position, and thence to the escapement stepper coils 12, as before mentioned, to cause the selected stepping wheels 26 to rotate two steps.

Meanwhile the third group of eighteen bits or pulses is picked up from the ledger card and sent through the cleared relays of bank 72 to close certain of these relays, as before.

The fifty-fourth pulse via the second tier rotor and associated stator contact now energizes the solenoid 50 as before, causing cam 60 to take a third-sixth of a revolution from 120° to 180° FIG. 1. Continued rotation of the step switch rotor causes the latter to pass through the sixty-third bit position re-energizing solenoid 50 thus to cause the pulse generator shaft to rotate for a fourth-sixth of a revolution from 180° to 240°, sending the first set of "four-bit" pulses to the relays of bank 72. From the relays of bank 72 which are closed by the earlier received data pulses, the four bit pulses from the pulse generator are then applied in parallel to the stepper coils 12 to index the corresponding read-in stepper wheels 26 four more steps. Relay bank 72 is then cleared as before, FIG. 1F, so that its contacts open, as by cutting off current to the hold coils of the relays, thus resetting the same. Relay bank 74 has been cleared by an earlier clearing operation, FIG. 1F, so that it is now available to receive the fourth and last group of eighteen bits from the magnetizable steps on the ledger.

The second tier rotor now steps through its seventy-second position whereupon a pulse is applied to the clutch solenoid 50 causing the clutch to take a half revolution permitting the pulse generator cam to rotate for a fifth-sixth of a revolution 240° to 300°. In FIG. 1D this step is equivalent to the first half of the second ⅔ of a revolution for the pulses 55–72. In order to permit the last 18 data pulses of the group 55–72 from the ledger card to be applied to close certain of the relays in bank 74 prior to the application of the interrogation pulses from cam 60 thereto, a time delay period approximately equivalent to nine pulses is required. Thus, at the eighty-one position, an additional pulse is applied to the solenoid 50 in a manner well known in the art to cause the clutch shaft to rotate the pulse generator cam through its sixth or final sixth of a revolution from 300° to 360°.

Various apparatus, old and well known in the art is available to perform the function of electrically energizing clutch solenoid 50 at a time after the break of the seventy-second pulse. One such apparatus and associated mechanism is shown and described in German Patent No. 658,244, issued March 28, 1938, to Landis & Gyr, A. G., Zug, Switzerland. The first and the second tier rotors are by this means rotatably advanced in a forward or clockwise direction, as before to a "home" position as seen in FIGS. 1C and 1D. This advancing movement causes the second tier rotor to engage contact 81 thereby completing an electrical circuit from the B+ to the solenoid 50 enabling the clutch to cycle the pulse generator cam 60 through the last sixth of a revolution as afore-described.

The cam 60 is thus caused to move from the 300° position to the 360° position sending the second half of the second group of four bit pulses through the closed relays of bank 74 from which point these pulses are forwarded over parallel lines to the stepper solenoids 12 to step the stepping wheels 26, the last four positions. The schematic representation of FIG. 1a illustrates the serial disposition of each of the pulses or bits on the magnetizable material 92. As before mentioned each relay in the relay banks is electrically associated with a respective actuator rack or column in the accounting machine. However, since there are 14 racks, only 28 of the 36 relays are actually used for amount information storage. The remaining 8 relays are used for controlling various other parts of the accounting machine. Each one of the 14 information storage relays is electrically connected to a separate one of the 14 transducer read-in electromagnets 12 in the manner aforedescribed.

Assuming, for the sake of the present description, that the number to be stored is 5879, as shown in FIG. 1b, the first bit of the digit 9 is read first, the first bit of the digit 7 is read second, the first bit of the digit 8, third, and so on until all of the significant digits have been read. The number 5879 consists of the four combinations of the 1—2—4—4 binary code illustrated schematically in FIG. 1b.

Although a total of 72 pulses or bits are utilized in the present system to encode the digits from 0 to 9 inclusive as well as other desired information in binary code, only the pulses from the information-data track are stored in the two relay banks and later forwarded to the read-in transducer mechanism. By means of additional electrical controls and distributor apparatus including stepping switches and the like shown schematically in FIG. 1 the pick-up heads of the assembly 80 are electrically switched into circuit with their respective relay columns. In this manner as each pulse is read or sensed from the tape it is electrically forwarded to the relay associated with the actuator rack for that particular digit.

Referring more particularly to FIG. 1C there is shown a step switch distributor including the details of the interconnections between the stator portions of the switch and the operate coils of the various relays in the two banks of relays 72 and 74. As can be seen, the first eighteen contacts of the stator, as viewed in a clock-wise direction, are wired to the operate coils of the relays in relay bank 72. Continuing in a clockwise direction, the second eighteen stator contacts are wired to the operate coils of the relay bank 74. The third eighteen stator contacts are wired in common with the first set of eighteen contacts to relays in bank 72, while the fourth set of eighteen contacts are wired in common with the second set of operate coils of relay bank 74.

Figure 1E:
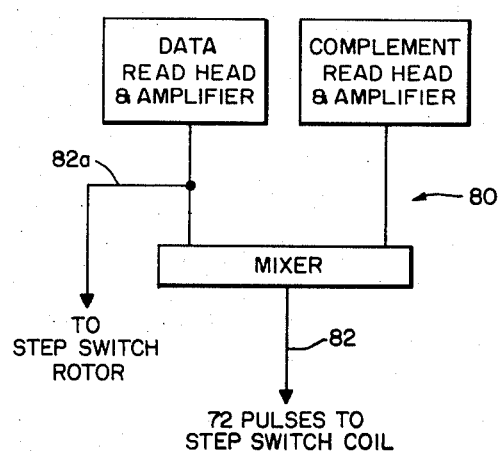
FIG. 1E is a block diagram of the control signal apparatus for the present invention.
Figure 1F:
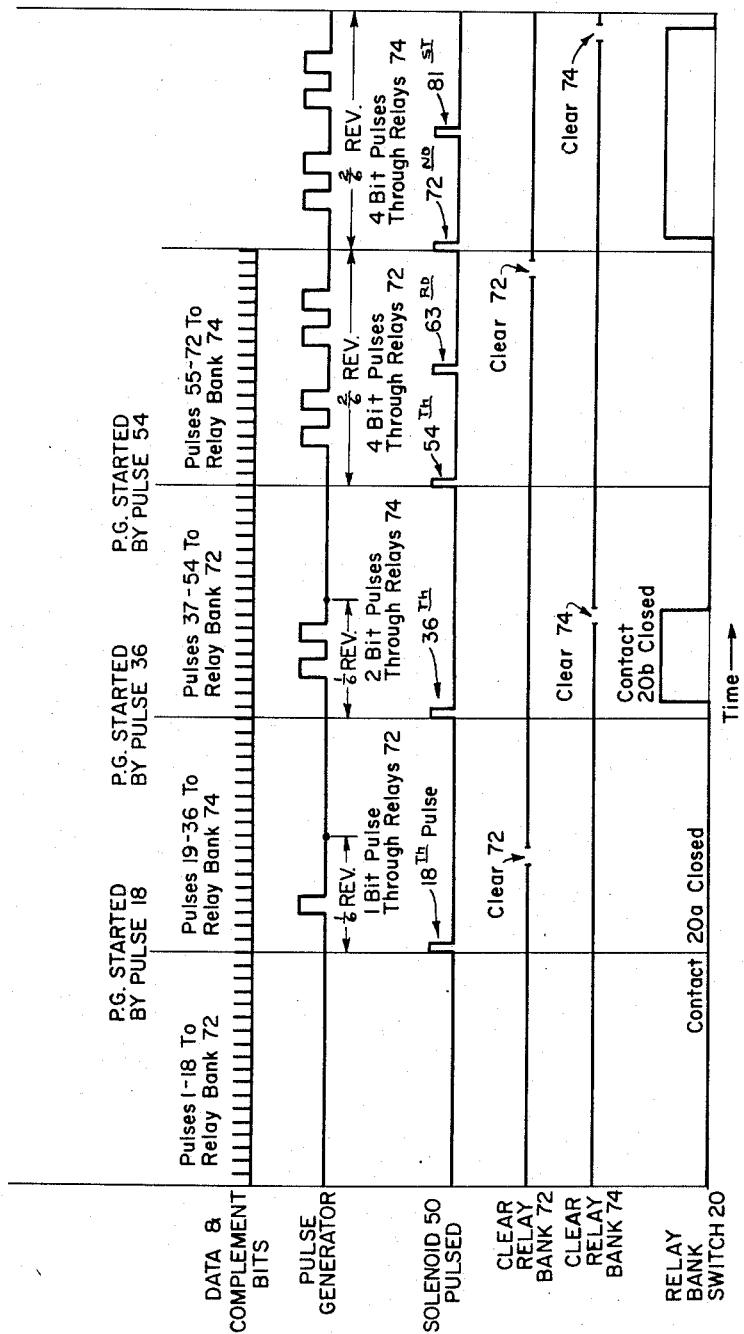
FIG. 1F is a timing diagram.

Referring to FIG. 1E there is seen a means for applying the pulses from the pick-up head to the respective relays in the two banks 72 and 74.

This apparatus may include a data read head and amplifier and a complement read head and an amplifier, the outputs of which are fed to a mixer all of known construction. A lead from the data read head and amplifier output is fed to the step switch distributor rotor so that all the data pulses can be fed to the rotor and thus to the relays in banks 72 and 74. The 72 pulse output from the mixer is fed to the step switch coil, not shown, to cause the switch to step 72 times from its first position to its seventy-second position. It is to be understood, of course, that the stepping switch is simply one example of apparatus for providing the distribution of pulses which is required to enable the operation of the present apparatus and is set forth herein to illustrate what could be substituted for the black box labeled 86 in FIG. 1 of the drawings.

For each pulse derived from a closed relay in each actuator rack position or column, the stepper solenoid 12 for that rack is rotated one tooth or step whereby the desired number, in this case the number 5879, is finally stored in the pinion wheels 32.

As will be described hereinafter, the limiting, arresting or detenting mechanism 42, provides means for limiting the counterclockwise travel of the pinions 32 and is rockable into and out of the path of travel of the long or zero tooth 34 of each pinion. Mechanism 42 is substantially identical in construction and operation to blade 803 of Butler described in column 76 of Butler Patent 2,629,549 beginning at line 1.

By means of mechanism 38, rack 30 is adapted to be reciprocated across pinion 32 while engaged therewith so that the information standing in the pinion is transferred to the rack, as will be explained presently. The forward and rearward excursions of the racks, as indicated by arrow 40, are thus selectively terminated by limit means 42. Member 44 which is moved into and out of path of pinion 32, is adapted to zeroize the pinion and thus prevent erroneous information from being transferred into the racks during operation of the device. The construction and operation of member 44 will be described more fully later on. The member 42 is rocked rightwardly into a position in which its upper edge portion is in the path of travel of the long tooth 34 of each of the pinions. Now, if toothed racks 30 are caused to move in their total taking or reading direction, i.e., to the left as viewed in FIG. 1, the pinions will be rotated counterclockwise until each long tooth 34 engages the leading edge of member 42 whereby each pinion and its associated rack 30 is arrested in a position corresponding to the coded digits in the magnetic portion of the document 78. Printing of this information may then be accomplished during the remainder of the accounting machine cycle in a manner and by means of apparatus described in Butler Patent 2,629,549. Thus it is possible to translate the serial binary coded pulses from the document into parallel decimal actuator rack positions for each of the decimal digits 0–11.

Having described the novel system of the invention certain novel features of the apparatus will now be described. This apparatus bears some similarity to the computing units, i.e., crossfooter-register mechanisms of Patents 2,629,549, 2,715,999 and 2,721,695 but differs in certain important aspects as will hereinafter be brought out more particularly in the following portion of the specification.

Referring now to FIG. 2 of the drawings there is shown a plurality of electromagnets 12 corresponding to the electromagnet 12 of FIG. 1. Each electromagnet is disposed beneath an individual one of a plurality of actuator racks 30 similar to the racks 511 and 512 shown and described in the Butler patent. Although in this embodiment 14 racks are specified, it is to be understood that other and different types of racks could be employed and that more or less than the herein described number of racks could be utilized.

As is apparent in FIG. 2 the spacing between the actuator racks narrows somewhat on the left side of the machine due to the absence of crossfooter pinion mechanisms in this location. As a result, actuator racks 30 disposed on this side are relatively closely spaced together.

The so-called "C" register position in the accounting machine (see Patent 2,765,980 to B. A. Runde) is utilized to receive the transducer system read-in mechanism. It is understood, however, that a different location of parts may be employed in those instances in which the racks are differently shaped, e.g., wherein the racks are arcuate or in which the racks are disposed other than in parallel side by side planes.

Figure 3:
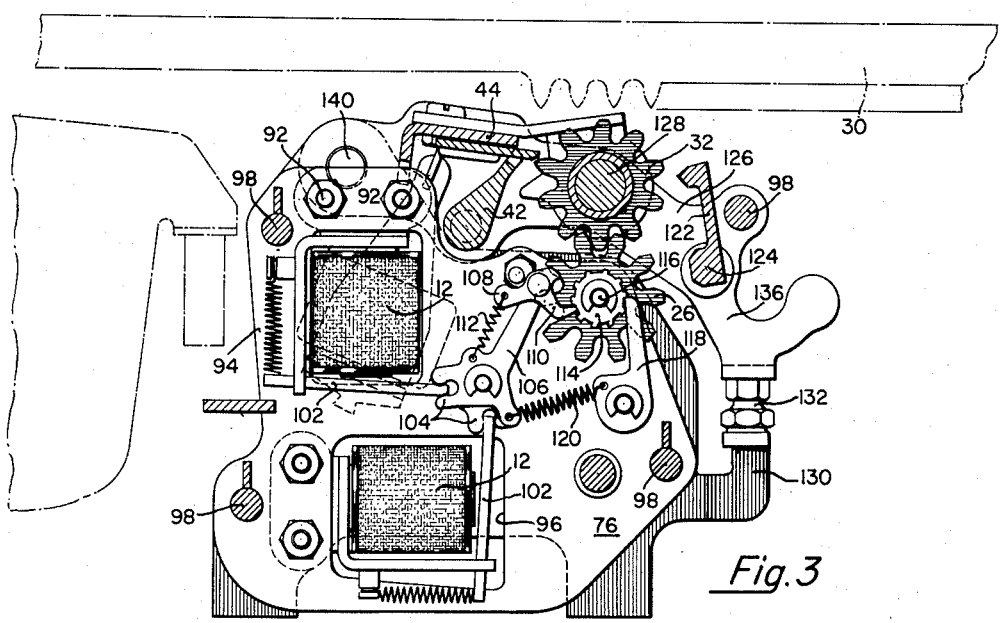
FIG. 3 is a sectional view along the line 3—3 of FIG. 2 showing certain parts of the mechanism in their inactive positions with respect to the actuator rack of the machine.
Figure 4:
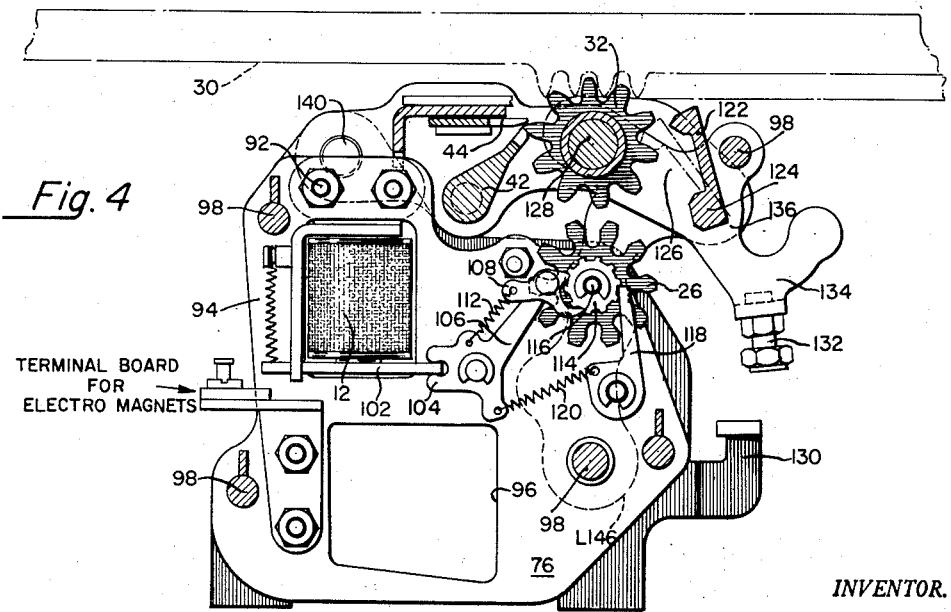
FIG. 4 is a view similar to FIG. 3 but with certain of the parts of the device displaced to their active positions with respect to the machine racks.

The electromagnets 12 are supported in any suitable fashion as by bolts 92, FIGS. 3 and 4 secured to cross braces 94, where, as shown, the pitch of the racks is relatively wide. A separate electromagnet is located beneath a respective one of the actuator racks 30 where the pitch of the racks is relatively narrow (positions 10–14 inclusive). In these positions the electromagnets 12 are disposed in staggered pairs as shown in FIG. 3. Each electromagnet in this closely spaced group is disposed partially within an opening 96 in cross-brace 94. Longitudinal supporting members 98, together with end plates 100—100 substantially identical to those of the Butler machine sufficiently rigidify the structure to prevent yawing or warping of parts during operation thereof. The uppermost electromagnet 12, FIG. 3, of each pair is disposed with its clapper 102 projecting horizontally therebeneath while the lower-most electromagnet of each pair is situated with its clapper 102 projecting vertically alongside thereof, thus to provide proper clearance for the movable portions of each electromagnet assembly.

Each clapper 102 engages the bifurcated end 104 of a rockable escapement arm 106. The opposite end of the arm 106 is provided with a movable escapement pawl 108. The nose 110 of the pawl is biased by means of spring 112 into engagement with its respective advance drive wheel 114, secured to ratchet wheel 26, and is rotatable on its respective shaft 116. An anti-backup device 118 is biased into engagement with wheel 114 by means of spring 120, the opposite end of which is attached to the escapement arm 106. Thus it can be seen that each actuator rack is provided with a separate, independent, rotatable translating or transducer mechanism. In the embodiment of the invention set forth in FIGS. 2–8 inclusive, the 14 actuator racks are numbered from right to left, beginning with number one on the right side and terminating with number fourteen at the left of the figure, as shown most clearly in FIG. 2.

An elongated member 122 pivoted about shaft 124 differing in configuration but similar in operation to bail rod 880 described in column 85, line 59 of Patent 2,265,-549, moves with and is adapted to temporarily restrain pinions 32 during the course of the latter's movement upward into engagement with the racks. As described in the aforementioned patent, this mechanism prevents accidental rotation of the pinions which, if unrestrained, might rotate causing a transfer of erroneous digital information into the racks.

In order to utilize the serial binary input which, as earlier mentioned, takes the form of electrical impulses which are applied to the electromagnets 12, the ratchet wheel associated with each electromagnet is rotated as before mentioned, while engaging a pinion wheel to thereby effect a transfer of digital information from the electromagnet to the pinion wheels, after which, as will now be explained, the pinions are elevated into engagement with the racks.

Pinion elevating apparatus

A pivoted pinion supporting frame 126 for the read-in transducer unit, FIGS. 2–5 has a single pinion supporting shaft 128. The pinion shaft is supported between and secured to the pinion frame right and left end plates R100 and L100, FIG. 2.

The upper ends of projections 130, FIGS. 2, 3 and 5 extending upwardly from the lower rightward corners of the read-in transducer pinion frame side plates R100 and L100 are turned horizontally to abut small pads on the heads of two screws 132—132 threaded into horizontally bent ends of projections 134 extending downwardly from the rear ends of pinion side plates 136 and 138. The screws 132—132 permit adjustment of the pinions frame with respect to the actuator racks 30.

The means to rock shaft 140 and thus move the pinion frame to engage the pinions with the actuator racks 30, as shown in FIG. 4, and return them to their rest or normal positions as shown in FIG. 3, include roller 142, FIG. 5, on the ends of shaft 144, the cams 146, shaft 148, crank 150 and stud 152, is substantially identical to the crossfooter unit described in Patent 2,629,549 beginning at line 10, column 72. In the Butler accounting machine 25 automatic control lanes were provided but several, including lane 23, were left unused. The transducer read-in stepper mechanism of the present invention utilizes lane 23.

The actual machine embodiment resulting from the application of the present invention to a physical structure utilizes electromechanical program control functions, in the lanes indicated, substantially identical to those described and claimed in U.S. patent application, S.N. 492,206, filed February 4, 1955, entitled "Remote Function Control System" to O. Banik et al. and assigned to the same assignee as the present invention. However, inasmuch as the Butler accounting machine has provisions for automatic mechanical machine sensing from a program control panel or tray, the present description will be directed to this latter structural configuration. It is to be understood that either electromechanical or mechanical sensing of machine functions may be employed as desired. Furthermore, the accounting machine with which this present invention is associated is generally controlled by a combination of carriage positions as called for by pins set in the control panel and electromagnetically actuated pin tappets.

Automatic lane sensing control

Referring now more particularly to FIG. 5, a sensing pin 154 has its upper portion vertically slidably guided in the lane 23 apertures in apertured guide plates (not shown) but identified by the numerals 1806 and 1809 in Butler 2,629,549. A cam 156 secured in the lane 23 position on shaft 157 cooperates with a roller 158 carried by control lever 160 having its opposite end coupled with sensing pin 154 in the lane 23 position in the sensing pin row. Control lever 160 extends beyond a guide plate (not shown) to engage its rightward end (forward as viewed herein) under the end of the rightward arm of a bell crank 162 mounted in the lane 23 position on stud 164. The bell crank is limited in its downward movement by means of stud 166.

The downward arm 168 of the bell crank 162 carries a stud 170 projecting through an elongated slot 172 in the rightward end of a link 174 which, at its leftward end is pivotally connected to the upstanding right side arm of the yoke member 176 mounted on stud 178. A tension spring 190 connected between the downward arm of the bell crank 168 and the link 174 normally maintains stud 170 in the leftward end of slot 172.

Total slide locking mechanism

The yoke member 176 has an arm 180 normally stopped in a rest position against a stud (not shown) and an arm 182 bearing against the upper edge of the coupling link 184. As link 174 is moved rightwardly in a machine cycle the vertical arm 181 integral with arm 182 is engaged by stud 183 so that clockwise movement of yoke 176 causes depression of arm 182 to couple link 184 with the square stud on the slide 188.

Bell crank latching mechanism

As described in Butler 2,629,549, column 166, beginning at line 58, certain ones of the automatic controls resulting from the raising of the ends of the control levers 160, when upward movement of the sensing pins 154 are limited by certain control projections (not shown) must be maintained beyond that time in the machine cycle at which the sensing pins must be restored to normal, prior to movement of the machine carriage to another columnar position. For that purpose, means are provided to latch certain ones of the bell cranks 162 in the positions to which they are rocked by their control levers 160 until a time in the machine cycle subsequent to the restoration of the various other sensing pins (not shown). To this end a latch 192, FIG. 5 is used. Latch 192, is substantially identical in construction and operation to that described in Butler 2,629,549 and therefore no further description of this mechanism is felt to be necessary. It is sufficient to say, however, that at the selected time in the machine cycle the latch 192 is lowered so that its flange 194 engages the projection 196 on bell crank 168 restraining the crank 168 until released later in the machine cycle.

As is described in detail in one or more of the patents mentioned herein above total slide 188 is normally moved rightwardly in the direction of the arrow 198 prior to the movement of the actuator racks in any accounting machine cycle. By means of certain timing devices (not shown) and which form no part of the present invention, a machine cycle is established such that engagement of pinions 32 with racks 30 follows the rightward excursion of the total slide 188.

The pinion supporting frame is, as previously described, secured to the shaft 140 which is journalled in the side plates 136 and 138 whereby the frame is rockable to raise the pinions 32 into engagement with racks 30. For that purpose, each of the rollers 142 is embraced in a cam slot 200 in an arm 146 (FIGS. 2 and 5) located adjacent the inner side of the respective side plates 136—138 and secured to shaft 148 journalled in bushings secured in side plates 136—138. The arms 106, which include the slots 200 are substantially identical in construction and operation to the arms 799 described in Butler 2,729,392, earlier mentioned herein.

The shaft 148 and two arms 146 are normally so positioned that the rollers 142 are in the rightward short arcuate portions of the slots 200 so that the pinions 32 are in their lower positions out of mesh with the actuator racks. When the shaft 148 is rocked clockwise from its normal position by means controlled by the totalizer function controls as disclosed in Butler Patent 2,629,549, the rollers 142 and thus, the pinion supporting frame are swung upwardly about the axis of the shaft 140 sufficiently to mesh pinions 32 with the actuator racks. Upon rocking the shaft 140 counterclockwise back to normal position, the pinions are again lowered to unmesh them from the actuator racks.

In a machine cycle in which the read-in transducer system of the present invention is automatically placed in operation, assuming that numerical information stored in its pinions is correct, the lane 23 sensing pin 154 encounters a projection above it in lane 23. The end of the control lever 160 is elevated rocking the bell crank 162 counterclockwise pulling link 168 rearwardly thus rocking the yoke member 176 clockwise causing member 182 to be depressed. Depression of member 182 forces member 184 downwardly into locking engagement with the square stud 186 on slide 188. Member 184 is pivotally mounted to member 150. As the total slide is moved rightwardly the shaft 148 is rocked clockwise elevating the pinions into the racks. At this point in the operation of the machine the actuator racks move to the left relative to the pinions associated therewith in the direction shown in FIG. 8b, until the longer tooth 34 of each pinion limits against member 42 to locate each rack at a position corresponding to the number originally stored in each pinion, as aforementioned.

As the shaft 148 and the left and right cam arms L146—R146 are rocked clockwise by the foregoing means to raise pinions 32 toward racks 30 the cam end of a projection 202 extending from right cam arm R146, after the pinions have pivotally meshed with the racks, depresses a stud 204 to retract flange 122, FIGS. 2 and 3 from between the teeth of the pinions. This mechanism is substantially identical in construction and operation to that described in Butler Patent 2,721,695 beginning at line 68 of column 8.

Error correction

If, during the operation of the transducer read-in mechanism, an error is detected, as a result either of the application of an excessive number of pulses to the stepper electromagnets 12 or by virtue of a wrong number having been sensed by the head assembly, the erroneous information can be immediately corrected prior to the engagement of the pinions with their respective racks in the following manner:

Referring to FIGS. 2, 6 and 7 there is shown a zeroizing or cross slide mechanism 44. An elongated flat cover member 206 is attached at its opposite ends to the pinion frame end plates 136 and 138 of the transducer unit. Cross slide member 208 is provided with elongated slots 210 which cooperatively, slidingly engage a plurality of lugs 212 secured to the cover member 206.

The leftward end of the cross slide 208, FIGS. 2 and 6, has attached thereto a bifurcated depending ear 214. Secured, as by bolts 216 to the left side plate L100 of the device is an electromagnet 218. The pivoted clapper 220 engages the bifurcated end 214 of the cross slide 208 and is biased by means of spring 222 away from the core of the electromagnet.

Referring particularly to FIG. 6 it is seen that the cross slide 208 is provided with a number of L-shaped hook-like tabs or projections 230 along one edge thereof. The slide is normally positioned, as shown, so that the teeth including the long tooth of each of the pinions 32 when rotated counterclockwise, for "reading in," clear the hooked end of each of the cross slide projections.

As shown in FIG. 7, when it is desired or necessary to correct an erroneous entry, the electromagnet 218 is pulsed, pulling in the clapper 220 causing the cross slide 208 to move in the direction of the arrow 228 (FIG. 6) effectively blocking the long tooth 34 of each of the pinions. In order to clear or remove an erroneous entry electromagnets 12 are each pulsed by means of the pulser 46 a total of 11 times, this being the total pulse output thereof. Total blocking bail 42 is automatically retracted rearwardly out of the path of the pinion teeth in the same operative cycle in which the pinion frame is lowered to restore the pinions into engagement with the escapement drive wheel 26.

Each stepper escapement 24 is then caused to rotate its respective ratchet wheel 26 in the direction of the arrow 232 and to turn each of the pinions 32 in the direction of the arrow 234 until the long tooth 34 of each pinion abuts a respective one of the cross slide projections 230 as shown in dotted outline in FIG. 6. Obviously each pinion will not always require the same number of pulse steps to return it to zero. Additional pulses to that number actually required to zeroize each pinion are dissipated within the stepper solenoid coil and have no further effect thereon. At the termination of the rotation of the pinions, each pinion will be standing in its zero position inasmuch as the long tooth 34 is considered to be zero and each pinion has been stepped forwardly through the intervening numbered positions. The cross slide electromagnet 218 is then released after which the correct digital information can be placed in the pinions in the manner earlier described herein.

There has thus been described a preferred embodiment of the invention, providing a novel electromechanical transducer system and apparatus for use in an accounting machine whereby digital electrical pulse information may be translated into mechanical rack positions in the machine, which is thus conditioned for printing the information by conventional apparatus in the machine. The invention also provides means for remotely controlling a plurality of similarly equipped accounting machines by means of a single machine equipped as herein described.

What is claimed is:

1. A transducer system for translating electrical impulses into numerical values wherein each numerical value is identified by a position selected from a predetermined number of positions of a differential positionable member in an accounting machine, comprising, a plurality of electromagnets, an escapement mechanism for each electromagnet, a rotatable member engaging said escapement and adapted to be rotated thereby to a number indicating position while said member is disengaged from said differential positionable member, means operatively associated with said rotatable member for causing said member to engage said differential positionable member, and limit means permitting unidirectional rotation of said rotatable member while said member is engaged with said differential positionable member whereby said number indicating position is transferred to said differential positionable member.

2. A transducer system for translating electrical impulses into numerical values wherein each numerical value is identified by a position selected from a predetermined number of positions of a differential positionable member in an accounting machine comprising, an electromagnet, an escapement mechanism operated by said electromagnet, a rotatable member engaging said escapement and adapted to be rotated thereby to a number indicating position while said member is dissengaged from said differential positionable member, means operatively associated with said rotatable member for causing said member to engage said differential positionable member, and limit means permitting unidirectional rotation of said rotatable member while said member is engaged with said differential positionable member whereby said number indicating position is transferred to said differential positionable member.

3. A transducer system in accordance with claim 2 wherein said escapement mechanism comprises an arm, means actuated by said electromagnet rockably engaging one end of said arm, a wheel engaging the opposite end of said arm and adapted to be rotatably driven thereby, and an antibackup member engaging said wheel permitting unidirectional movement thereof.

4. A transducer system for translating electrical impulses into numerical values wherein each numerical value is identified by a position selected from a predetermined number of positions of a differential positionable member in an accounting machine comprising, an electromagnet, an escapement mechanism operated by said electromagnet, a rotatable member engaging said escapement and adapted to be rotated thereby to a number indicating position while said member is disengaged from said differential positionable member, means operatively associated with said rotatable member for causing said member to engage said differential positionable member, and limit means permitting unidirectional rotation of said rotatable member while said member is engaged with said differential positionable member whereby said number indicating position is transferred to said differential positionable member.

5. A transducer system for an accounting machine comprising, a source of electrical current, a plurality of actuator racks, cam means driven by said accounting machine adapted to move said racks, a plurality of electromagnets, escapement means for each of said electromagnets, a plurality of storage relays disposed in groups, pulse generating means, means applying said electrical current to said pulse generating means, means electrically interconnecting said groups of relays, said pulse generating means and said electromagnets, individual pinion wheels operatively associated with each of said escapement means and rotatable thereby to information indicating positions in response to magnetic impulses applied to said electromagnets, and means engaging each of said pinion wheels whereby a transfer of said information to said actuator racks is effected during movement of said racks.

6. A transducer system for accounting machines comprising, a source of information data pulses, means for storing said pulses in groups, a pulse generator, means connecting said pulse generator to said storing means, a plurality of members movable to positions indicative of numerical values, separate rotatable means associated with each of said movable members and normally out of engagement therewith, means to rotate each of said rotatable means to positions indicative of a selected numerical value, means interconnecting said pulse generator and said storage means whereby pulses from said pulse generator are applied to said storage means for rotating said rotatable means to numerical value indicating positions, means for moving said rotatable means into engagement with said movable members, and means moving said movable members while engaged with said rotatable means whereby the numerical value indicating position data stored in said rotatable members is transferred to said movable members.

7. A system in accordance with claim 6 wherein each of said movable members comprises a toothed rack, and each of said rotatable means comprises a toothed pinion gear.

8. A system in accordance with claim 7 wherein said means for rotating each of said rotatable means comprises an escapement mechanism including a toothed escapement wheel engageable with its associated rotatable means and a solenoid actuated pawl to rotate said escapement wheel step by step to numerical value indicating positions.

9. A system according to claim 6 wherein said pulse storing means comprises a plurality of groups of relays.

10. A transducer system for an accounting machine comprising, a source of electric current, a plurality of movable racks, drive means actuated by said accounting machine to yieldably reciprocate said racks, a plurality of electromagnets, an escapement arm for each of said electromagnets, a plurality of escapement wheels, each escapement arm retractibly engaging a respective escapement wheel, a plurality of storage relays disposed in groups, pulse generating means, means connecting said current source to said pulse generating means, means electrically interconnecting said storage relays, said pulse generating means and said electromagnets and adapted to apply pulses from said pulse generator to said relays and to said electromagnets, means interconnecting said relays for alternately energizing said relay groups whereby the pulses are distributively serially applied first to one group and then to another group, means operatively associated with each of said escapement wheels and rotatable step by step thereby in response to impulses applied to said energized relays, and a cam mechanism for disengaging said rotatable means from said wheels and engaging said rotatable means with said racks whereby a transfer of information is made from said rotatable means to said racks during movement of said racks while engaged with said rotatable means.

11. A transducer system for an accounting machine comprising, a source of electrical current, a plurality of movable racks, drive means actuated by said accounting machine to yieldably reciprocate said racks, a plurality of electromagnets, an escapement arm for each of said electromagnets, an escapement wheel retractibly engaged by each arm, a plurality of storage relays, a source of numerical position indicating pulses, means interconnecting said relays and said source of indicating pulses whereby said pulses close selected ones of said storage relays, a pulse generating means, means electrically interconnecting said storage relays, said pulse generating means and said electromagnets and adapted to apply pulses from said pulse generator to said relays thereby energizing said electromagnets associated with the closed relays, rotatable means operatively associated with each of said escapement wheels and rotatable step by step thereby in response to impulses from said closed relays, and a camming mechanism disengaging said rotatable means from said wheels and engaging said rotatable means with said racks whereby said position indicating pulse information is transferred from said rotatable means to said racks during movement of said racks while engaged with said rotatable means.

12. A transducer system for an accounting machine comprising, a source of electric current, a plurality of actuator racks movable to positions indicative of numerical values, cam means driven by said accounting machine for moving said racks, a source of value indicating pulses, a plurality of storage relays disposed in groups, means to apply said value indicating pulses to said relay groups to close selected ones of said relays in response thereto, a plurality of electromagnets, escapement means for each of said electromagnets, pulse generating means, means connecting said current source to said pulse generating means, means electrically interconnecting said groups of relays, said pulse generating means and said electromagnets, individual pinion wheels operable by respective ones of said escapement means and rotatable thereby to value indicating positions in response to pulses applied from said pulse generating means to the closed relays of said relay groups whereby said electromagnets are caused to correspondingly rotate said pinion wheels to value indicating positions, and means for disengaging said pinion wheels from said escapement means and engaging said wheels with said racks whereby a transfer of the value indicating position information from said wheels to said racks is effected during movement of said racks while engaged with said wheels.

13. A transducer system for an accounting machine comprising, a source of electrical energy, a plurality of members movable to value indicating positions, means to move said members, a plurality of electromagnets, escapement means for each of said electromagnets, pulse generating means, a plurality of storage relays, means electrically interconnecting said energy source with said storage relays, with said pulse generating means and with said electromagnets, a source of value indicating pulses, distributor means for applying said value indicating pulses to said relays to close selected relays corresponding to said value indicating pulses, means to cause said pulse generating means to apply pulses to said relays and to apply pulses from those of the relays that are closed to said electromagnets, rotatable means operatively associated with said escapement means and rotatable thereby to corresponding value indicating positions, and means for disengaging said rotatable means for said escapement means and engaging said rotatable means with said movable members whereby a transfer of said value indicating position information to said movable members is effected during movement of said movable members.

14. An electro-mechanical transducer for translating electrical impulses into numerical values wherein each numerical value of each number is identified by a position selected from a predetermined number of positions of movable rack members in an accounting machine comprising, a plurality of electromagnets, one for each rack member, an escapement mechanism for each electromagnet, a plurality of rotary members, a separate rotary member being engaged by a respective escapement mechanism and rotatable thereby to a number indicating position, a source of number indicating pulses, means to selectively apply said number indicating pulses to said electro-magnets to position said rotary members in correspondence with said number indicating positions, means to engage and disengage said rotary members with said rack members, means to limit the movement of said rotary members while disengaged from said escapement and engaged with its associated rack members whereby to transfer said number indicating values to said rack members upon movement of said rack members, and error correcting means associated with said limit means and adapted upon energization thereof to override said limit means.

15. The invention as set forth in claim 14 wherein said means limiting the movement of said rotary means comprises, a member adapted to engage said rotary members thereby to terminate the movement of the latter.

16. An electro-mechanical transducer for translating magnetic pulses into actuator rack positions in an accounting machine wherein each position selected from a predetermined number of positions of a plurality of actuator racks indicates a numerical value, said transducer comprising, means adapted to sense the presence of magnetic pulses on a magnetizable record member, a plurality of storage relays, means applying the sensed pulses to said storage relays to close selected ones of said relays, a plurality of electromagnets, an escapement mechanism operated by each electromagnet, a plurality of rotatable members, each escapement mechanism retractibly engaging an individual one of said rotatable members, a controllable source of electrical pulses, means applying said pulses to said storage relays, means selectively forwarding said pulses from the closed relays to said electromagnets whereby to move said rotatable members to numerical value positions corresponding to the number of applied pulses, means to disengage each rotatable member from its respective escapement mechanism and to engage said rotatable member with a respective rack, and limit means permitting unidirectional rotation of each of said rotatable members while said members are engaged with said racks whereby the numerical value indicating position information in said movable members is transferred to said racks.

17. The invention as set forth in claim 16 wherein said means engaging a rotatable member with its respective rack includes a cam, and a linkage adapted to move said rotatable member into engagement with said rack.

18. A transducer system for translating binary magnetic impulses into decimal numbers wherein the numerical value of each number is identified by a position selected from a predetermined number of positions of an actuator rack in an accounting machine comprising, a plurality of actuator racks, a plurality of storage relays, means to sense magnetic impulses and apply said sensed impulses to said storage relays thereby to selectively close certain of said relays corresponding to the number of impulses sensed, a plurality of electromagnets, one electromagnet for each actuator rack, an escapement mechanism actuated by each electromagnet, a rotatable member driven by each escapement mechanism, each rotatable member being provided with a plurality of projections thereon, at least one of said projections being of greater length than the remaining projections, a source of electrical scanning pulses, means interconnecting said pulse source with said storage relays and said electromagnetic, means to operatively apply said scanning pulses to said closed storage relays whereby a pulse from a closed relay is caused to energize a selected electromagnet causing its escapement mechanism to move its associated rotatable member in response thereto, means to disengage said rotatable members from their respective escapement mechanisms and engage said rotatable members with said racks, means to move said racks relative to said rotatable member, means to limit the movement of said rotatable members while engaged with racks whereby positional information in said rotatable members is transferred to said racks, zeroizing means for said rotatable members, and control means operatively associated with said zeroizing means, means to energize said control means so as to cause said zeroizing means to move into engagement with said projection of greater length whereby each of the rotatable members can be rotated to a predetermined zero position.

19. The invention as set forth in claim 18 wherein said control means comprises an electromagnet having a clapper operatively engaging said zeroizing means and adapted to move said zeroizing means into the path of the longest projection of each rotatable member.

20. The invention as set forth in claim 18 wherein said zeroizing means is a cross slide having means thereon adapted to engage each projection of greater length.

21. The invention as set forth in claim 20 wherein the means on the cross slide adapted to engage the projection of greater length comprise, a plurality of hook-like projections, one for each projection of greater length on each rotatable member.

22. A transducer system for translating binary electrical impulses into decimal numbers for visual recording, wherein the numerical value of each number is identified by a position selected from a predetermined number of positions of an actuator rack in an accounting machine, said transducer comprising, a source of electrical impulses, an electromagnet for said actuator rack, means connecting said electromagnet to said source of impulses, an escapement mechanism operatively associated with said electromagnet, a toothed wheel rotatable by means of said escapement in response to impulses applied to said electromagnet, limit means for said wheel, cam means associated with said toothed wheel for disengaging said wheel from said escapement and engaging said wheel with said rack, means for moving said cam means upon termination of rotation of said wheel by said limit means, and means to move said rack to a position determined by the numerical value stored in said wheel.

23. A transducer system for translating electrical impulses into numerical values wherein each numerical value is identified by a position selected from a predetermined number of positions of a differentially positionable member in an accounting machine comprising, in combination, a differentially positionable member, an escapement mechanism including an escapement wheel and an electromagnet operable to advance the escapement wheel one step for each electrical pulse received by the electromagnet, a rotatable pinion, means mounting the pinion for bodily movement from a position in engagement with said escapement wheel and out of engagement with said member to a position in engagement with the member and out of engagement with the escapement wheel, said escapement mechanism being operable when the pinion is in engagement with the escapement wheel to step the pinion angular distances corresponding to the number of pulses received by the electromagnet, and means limiting rotation of said pinion while in engagement with said differentially positionable member to the extent the pinion was rotated by the escapement mechanism whereby the number position of the pinion represented by the pulses received by the electromagnet is transferred to the member.

24. A transducer system for translating electrical impulses into numerical values wherein each numerical value is identified by a position selected from a predetermined number of positions of a differentially positionable member in an accounting machine comprising, in combination, a differentially positionable toothed member, an escapement mechanism including a toothed escapement wheel and an electromagnet operable to advance the escapement wheel one step for each electrical pulse received by the electromagnet, a pinion having teeth thereon capable of meshing with the teeth of the escapement wheel and the positionable member, said pinion having a tooth longer than the remaining teeth thereof, means mounting the pinion for rotation about its axis and for bodily movement from a position in meshing engagement with said escapement wheel and out of meshing engagement with said member to a position in meshing engagement with the member and out of meshing engagement with the escapement wheel, said escapement mechanism being operable when the pinion is in engagement with the escapement wheel to step the pinion angular distances corresponding to the number of pulses received by the electromagnet, means limiting rotation of said pinion while in engagement with said differentially positionable member to the extent the pinion was rotated by the escapement mechanism whereby the number position of the pinion represented by the pulses received by the electromagnet is transferred to the member, and means for zeroizing said pinion including an element projectible into the path of movement of only the longer tooth of the pinion.

25. A transducer system for translating data in binary notation into decimal notation wherein the decimal value is identified by a position selected from a predetermined number of positions of an actuator rack in an accounting machine comprising, in combination, an actuator rack, a relay operated switch, means to sense data magnetically coded in binary notation and to apply electrical signals to said relay to close the switch associated therewith for each such signal received by the relay, an escapement mechanism including an escapement wheel and an electrical pulse actuated electromagnet operable to step the escapement wheel for each pulse received thereby, a rotatable member having a plurality of projections thereon capable of meshing with the teeth of the escapement wheel and the teeth of the actuator rack, an electrical pulse generator, circuit means connecting the pulse generator to the switch of the relay and connecting the switch to the electromagnet of the escapement mechanism and serving to convey pulses from the generator to the electromagnet when the switch is closed, said escapement mechanism being operable when the rotatable member is in engagement with the escape wheel to step the member angular distances corresponding to the number of pulses received by the electromagnet, means for bodily moving said rotatable member out of engagement with the escapement wheel, and into engagement with said rack, and means for limiting the rotation of said rotatable member while engaged with the rack to the extent that the rotatable member was stepped by the escapement mechanism whereby positional information represented by the pulses received by the electromagnet from the pulse generator is transferred to the rack.

26. A transducer system for translating data in binary notation into decimal notation wherein the decimal value is identified by a position selected from a predetermined number of positions of an actuator rack in an accounting machine comprising, in combination, an actuator rack, a relay operated switch, means to sense data magnetically coded in binary notation and to apply electrical signals to said relay to close the switch associated therewith for each signal received by the relay, an escapement mechanism including a toothed escapement wheel and an electrical pulse actuated electromagnet operable to step the escapement wheel for each pulse received thereby, a rotatable member having a plurality of projections thereon capable of meshing with the teeth of the escapement wheel and the teeth of the actuator rack, one of said projections on the member being longer than the remaining projections thereof, an electrical pulse generator, circuit means connecting the pulse generator to the switch of the relay and connecting the switch to the electromagnet of the escapement mechanism and serving to convey pulses from the generator to the electromagnet when the switch is closed, said escapement being operable when the rotatable member is in engagement with the escapement wheel to step the member angular distances corresponding to the number of pulses received by the electromagnet, means for bodily moving said rotatable member out of engagement with the escapement wheel and into engagement with said rack, means to limit the rotation of said rotatable member while engaged with the rack to the extent that the rotatable member was stepped by the escapement mechanism whereby positional information represented by the pulses received by the electromagnet from the pulse generator is transferred to the rack, and means for zeroizing said rotatable member including an element projectible into the path of movement of only the longer projection of the rotatable member.

References Cited in the file of this patent
UNITED STATES PATENTS

| | | |
|---|---|---|
| 2,074,017 | Fuller et al. | Mar. 16, 1937 |
| 2,095,730 | Bellamy | Oct. 12, 1937 |
| 2,682,995 | Carey et al. | July 6, 1954 |
| 2,757,862 | Boyden et al. | Aug. 7, 1956 |